No. 894,772. PATENTED JULY 28, 1908.
F. R. BATCHELDER.
BELT.
APPLICATION FILED JAN. 8, 1908.

Witnesses
W. H. Evans
Geo. M. Copenhaver

Inventor
Frank R. Batchelder
By James W. Bevans
his Attorney

UNITED STATES PATENT OFFICE.

FRANK R. BATCHELDER, OF WORCESTER, MASSACHUSETTS, ASSIGNOR TO MILLS WOVEN CARTRIDGE BELT COMPANY, OF WORCESTER, MASSACHUSETTS, A CORPORATION OF MASSACHUSETTS.

BELT.

No. 894,772.  Specification of Letters Patent.  Patented July 28, 1908.

Application filed January 8, 1908. Serial No. 409,811.

*To all whom it may concern:*

Be it known that I, FRANK R. BATCHELDER, a citizen of the United States, residing at Worcester, in the county of Worcester and State of Massachusetts, have invented certain new and useful Improvements in Belts, of which the following is a specification.

This invention relates to improvements in belts, and the object is to provide simple means for effectively preventing the accidental detachment of the slide from the belt.

Figure 1:
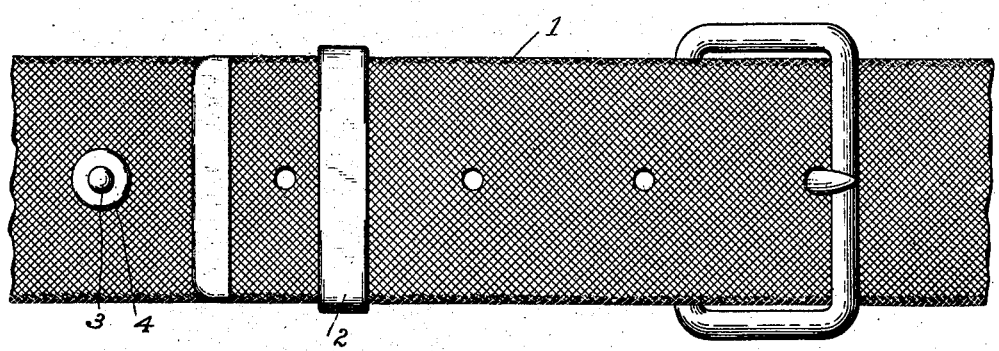
Figure 2:
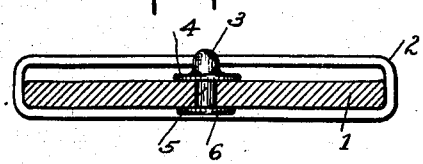
Figure 3:
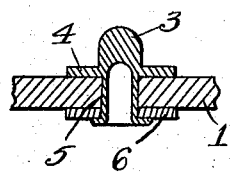

With the above object in view, the invention consists in the novel features of construction hereinafter fully described, particularly pointed out in the claims, and clearly illustrated by the accompanying drawing, in which Figure 1 is a face view of a portion of a belt with my invention applied thereto, and Fig. 2, a transverse sectional view of the same, taken through the belt at the stud and looking toward the slide. Fig. 3, a vertical sectional view through the stud and a portion of the belt.

Referring now more particularly to the drawing, the numeral 1 designates the belt and 2 the slide or band which is movable thereon to confine the free end thereof after the belt has been buckled. Unless some means is provided for preventing the slide or band from slipping from the belt when the latter is unbuckled the former would become detached and lost. This is especially true in connection with belts forming part of a soldier's equipment, as while on marches and in camp such articles are subjected to hard usage, thus entailing considerable expense on the part of the government in replacing missing pieces. To prevent the detachment of this slide or band, I provide a stud or projection 3, located preferably in the center of the transverse extent of the belt and on the opposite side of the slide to the buckle of the belt. The slide is thus confined between the stud and the buckle. I have shown a projection consisting of a stud having a base 4 formed integral therewith to engage one face of the belt, an integral eyelet 5 to extend through the material of the belt, and a disk 6 on the reverse side of the belt to receive the end of the eyelet which is upset or spread to hold the parts together. Any other form of projection might be employed however, if desired.

Having thus fully described my invention what I claim as new and desire to secure by Letters Patent of the United States, is:

1. The combination with a belt having a slide or band movable thereon to confine the free end thereof after buckling, of a stud thereon located on the opposite side of the band or slide to the buckle for the purpose set forth.

2. The combination with a belt having a slide or band movable thereon to confine the free end thereof after buckling, of a stud thereon located on the opposite side of the band or slide to the buckle and centrally of the transverse extent of the belt for the purpose set forth.

3. The combination with a belt having a slide or band movable thereon to confine the free end thereof after buckling, of a projection thereon located on the opposite side of the band or slide to the buckle and comprising a stud having a base to engage one face of the belt and an eyelet to extend through the material of the belt, and a disk on the opposite face of the belt, the end of the eyelet being upset or spread on said disk to hold the parts together.

In testimony whereof I affix my signature, in presence of two witnesses.

FRANK R. BATCHELDER.

Witnesses:
N. S. MOWRY,
M. F. DURKEE.